( 12 ) United States Patent
Rabinovici et al.

(10) Patent No.: US 9,298,506 B2
(45) Date of Patent: Mar. 29, 2016

(54) ASSIGNING RESOURCES AMONG MULTIPLE TASK GROUPS IN A DATABASE SYSTEM

(71) Applicant: TERADATA US, INC., Dayton, OH (US)

(72) Inventors: Sorana Rabinovici, Woodland Hills, CA (US); Venu Gopal Joshi, El Segundo, CA (US)

(73) Assignee: Teradata US, Inc., Dayton, OH (US)

( * ) Notice: Subject to any disclaimer, the term of this patent is extended or adjusted under 35 U.S.C. 154(b) by 0 days.

(21) Appl. No.: 14/499,544

(22) Filed: Sep. 29, 2014

(65) Prior Publication Data

US 2015/0113540 A1    Apr. 23, 2015

Related U.S. Application Data

(60) Provisional application No. 61/884,413, filed on Sep. 30, 2013.

(51) Int. Cl.
*G06F 9/45* (2006.01)
*G06F 9/50* (2006.01)
*G06F 9/48* (2006.01)

(52) U.S. Cl.
CPC ............ *G06F 9/5011* (2013.01); *G06F 9/4881* (2013.01)

(58) Field of Classification Search
None
See application file for complete search history.

(56) References Cited

U.S. PATENT DOCUMENTS

| 7,337,124 B2 * | 2/2008 | Corral ................. G06Q 10/06 705/7.17 |
| 2005/0172269 A1 * | 8/2005 | Johnson et al. ........ G06Q 10/00 717/124 |

\* cited by examiner

*Primary Examiner* — Chuck Kendall
(74) *Attorney, Agent, or Firm* — James Stover

(57) ABSTRACT

A computer running a database system receives one or more queries, each query comprised of parallel threads of execution working towards the common goal of completing a user request. These threads are grouped into a schedulable object called a task group. The task groups are placed within a specific multiple tier hierarchy, and database system resources allocated to the task groups according to their placement within the hierarchy. Beginning with the top tier of the hierarchy, resources remaining after allocations to each task group within a tier are passed to the next lower tier for allocation.

15 Claims, 16 Drawing Sheets

ASSIGNING RESOURCES AMONG MULTIPLE TASK GROUPS IN A DATABASE SYSTEM

CROSS REFERENCE TO RELATED APPLICATIONS

This application claims priority under 35 U.S.C. §119(e) to the following co-pending and commonly-assigned patent application, which is incorporated herein by reference:

Provisional Patent Application Ser. No. 61/884,413, entitled "DATABASE SYSTEM PRIORITY SCHEDULER," filed on Sep. 30, 2013, by Sorana Rabinovici and Venu Gopal Joshi.

FIELD OF THE INVENTION

The invention relates generally to the field of database applications, and more specifically to a database system priority scheduler which organizes database threads into task groups within a specific hierarchy, and assigns database system resources to task groups according to the hierarchy.

BACKGROUND OF THE INVENTION

A Database Management System ("DBMS") runs on a computer system that may include one or more computers. The computer system has resources, such as the central processing unit ("CPU"), memory, storage, input/output ("I/O"), etc., that are shared between the DBMS and other programs or systems that are running on the computer system. The DBMS itself may have resources that may be shared among different DBMS tasks that are executing at the same time. The assignment of resources among DBMS tasks is sometimes based on prioritizing tasks, with higher priority tasks being more likely, at any given time, to be assigned a greater share of the DBMS and computer system resources.

Operating systems, such as Linux, typically come with a built-in "scheduler" which is responsible for deciding which tasks run on which CPU and when. Teradata Database Systems include a "Priority Scheduler" built on top of the operating system scheduler to manage tasks and other activities that run in or support the database work. Having a database-specific priority scheduler has been a powerful advantage for Teradata Database users, allowing different types of work with varying business value and urgency to be managed differently.

Many Teradata Database users supplement their intelligence-oriented, decision-making data warehouse queries with very quick operational-like interactive queries, often from the web, sometimes supporting dashboards and other intranet or internet applications. Having a robust priority scheduler allows those diverse types of applications to coexist on the same platform, and access the same data tables cooperatively, while protecting the aggressive performance goals of the shorter work.

DETAILED DESCRIPTION OF THE INVENTION

Figure 1:
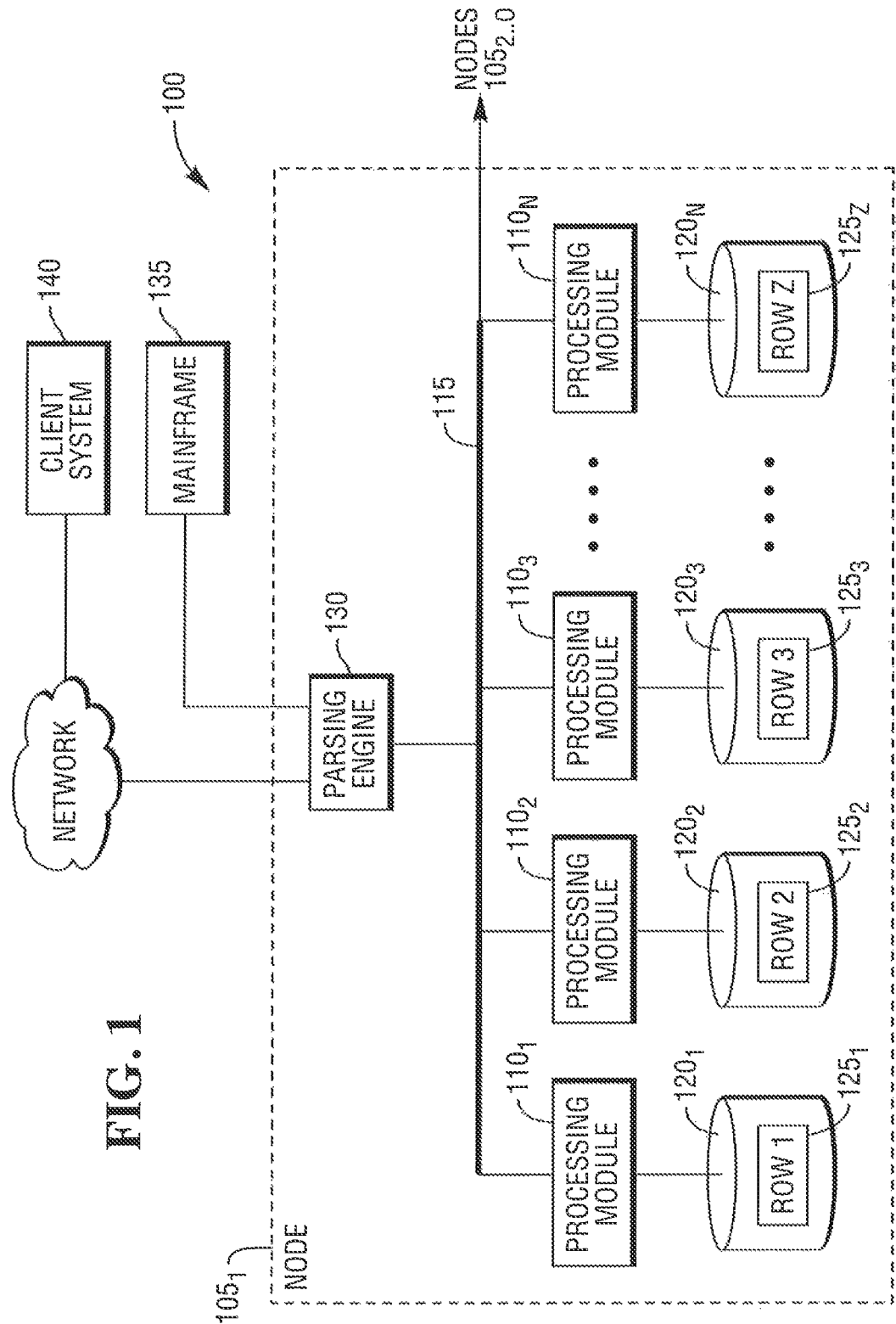
FIG. 1 is a block diagram of a node of a parallel processing database system.

The priority scheduler disclosed herein has particular application, but is not limited, to large databases that may contain many millions or billions of records managed by a database system ("DBMS") 100 (or "system"), such as a Teradata Active Data Warehousing System available from the assignee hereof. FIG. 1 shows a sample architecture for one node $105_1$ of the DBMS 100. The DBMS node $105_1$ includes one or more processing modules $110_{1 \ldots N}$ (or "CPUs"), connected by a network 115, that manage the storage and retrieval of data in data-storage facilities $120_{1 \ldots N}$. The DBMS 100 may include multiple nodes $105_{2 \ldots N}$ in addition to the illustrated node $105_1$, connected by extending the network 115. In one embodiment, each node may consist of multiple sockets, each of which may have one or more cores. For the purposes of this application, a core will be referred to as a "CPU." In one embodiment, a "virtual processor" is a collection of processes that run on the same node and share a set of common resources. An AMP, acronym for "Access Module Processor," is a type of virtual processor used to manage the database. In one embodiment, a node may execute Y virtual processors on top of X CPUs, where Y can be greater than X. In one embodiment, for the purposes of this application, a "process" is a single instance of the execution environment of a single executable file, or program. In one embodiment, a "task" is a single thread of execution within a process. In one embodiment, a "partition" is a construct for grouping tasks together and managing them across multiple virtual processors.

Partitions, which are operating system ("OS") processes, run in virtual processors. Tasks, which are OS threads, run in partitions.

For the case in which one or more threads are running on a single virtual processor, the single virtual processor swaps among the threads.

For the case in which N threads are running on an M-virtual-processor node, the node's operating system schedules the N threads to run on its set of M virtual processors. The threads are spread among the virtual processors. For example, if there are 4 threads and 4 virtual processors, then typically each thread would run on its own virtual processor. If there are 8 threads and 4 virtual processors, the 8 threads would be spread among the 4 virtual processors, in which case swapping of the threads might occur.

Each of the processing modules $110_{1 \ldots N}$ manages a portion of a database that is stored in a corresponding one of the data-storage facilities $120_{1 \ldots N}$. Each of the data-storage facilities $120_{1 \ldots N}$ includes one or more disk drives. The system stores data in one or more tables in the data-storage facilities $120_{1 \ldots N}$. The rows $125_{1 \ldots Z}$ of the tables are stored across multiple data-storage facilities $120_{1 \ldots N}$ to ensure that the system workload is distributed evenly across the processing modules $110_{1 \ldots N}$. A parsing engine 130 organizes the storage of data and the distribution of table rows $125_{1 \ldots Z}$ among the processing modules $110_{1 \ldots N}$. The parsing engine 130 also coordinates the retrieval of data from the data-storage facilities $120_{1 \ldots N}$ in response to queries received from a user at a mainframe 135 or a client computer 140. The DBMS 100 usually receives queries and commands to build tables in a standard format, such as SQL.

In one implementation, the rows $125_{1 \ldots Z}$ are distributed across the data-storage facilities $120_{1 \ldots N}$ by the parsing engine 130 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket". The hash buckets are assigned to data-storage facilities $120_{1 \ldots N}$ and associated processing modules $110_{1 \ldots N}$ by a hash bucket map. The characteristics of the columns chosen for the primary index determine how evenly the rows are distributed.

In addition to the physical division of storage among the storage facilities illustrated in FIG. 1, each storage facility is also logically organized. One implementation divides the storage facilities into logical blocks of storage space. Other implementations can divide the available storage space into different units of storage. The logical units of storage can ignore or match the physical divisions of the storage facilities.

Figure 2:
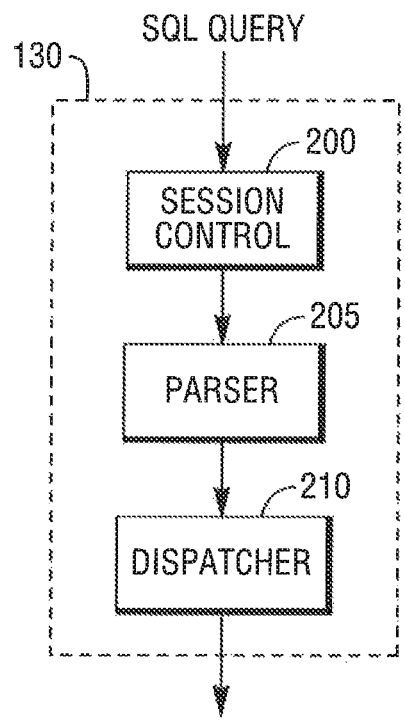
FIG. 2 is a block diagram of a parsing engine.

In one example system, the parsing engine 130 is made up of three components: a session control 200, a parser 205, and a dispatcher 210, as shown in FIG. 2. The session control 200 provides the logon and logoff function. It accepts a request for authorization to access the database, verifies it, and then either allows or disallows the access.

Figure 3:
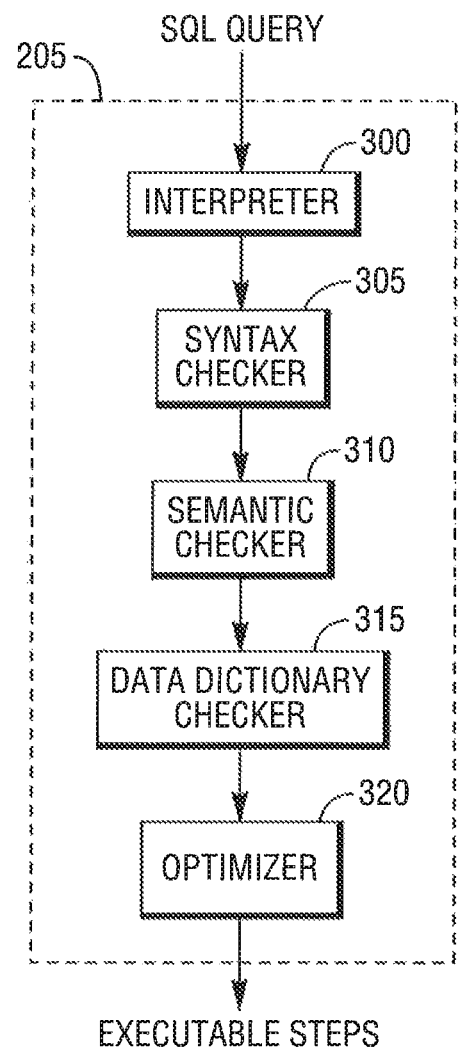
FIG. 3 is a block diagram of a parser.

Once the session control 200 allows a session to begin, a user may submit a SQL query, which is routed to the parser 205. As illustrated in FIG. 3, the parser 205 interprets the SQL query (block 300), checks it for proper SQL syntax (block 305), evaluates it semantically (block 310), and consults a data dictionary to ensure that all of the objects specified in the SQL query actually exist and that the user has the authority to perform the request (block 315). Finally, the parser 205 runs an optimizer (block 320), which develops the least expensive plan to perform the request and produces executable steps to execute the plan. A dispatcher 210 issues commands to the processing modules $110_{1 \ldots N}$ to implement the executable steps.

Linux Operating System Scheduler

The scheduler included with the current SUSE Linux Enterprise Server (SLES 11), referred to as the Completely Fair Scheduler, operates first and foremost on individual tasks and, like earlier schedulers, runs independently on each node in a massively parallel processing (MPP) configuration. One key characteristic of the Linux Completely Fair Scheduler is that it implements priorities using a hierarchy. Viewed as a tree structure, the level that a task is positioned in this tree will influence the share of resources that that the task receives at runtime.

Another key characteristic of the Completely Fair Scheduler that is particularly important to Teradata Database System implementations is that the SLES 11 scheduler can group tasks that have something in common together at the operating system level. In a Teradata Database System, this grouping capability can readily be used to represent all the tasks within one request on a node, or all the tasks executing within one workload on the node.

When task grouping is used, two levels of resource sharing will take place: first at the group level, and then within the group at the task level. Both groups and tasks can co-exist in a priority hierarchy within SLES 11.

Task grouping is implemented in the SLES 11 scheduler by means of a "control group" mechanism. Control groups allow partitioning and aggregating of tasks that share common characteristics, such as belonging to the same workload or the same request, into hierarchically-placed groups.

Figure 4:
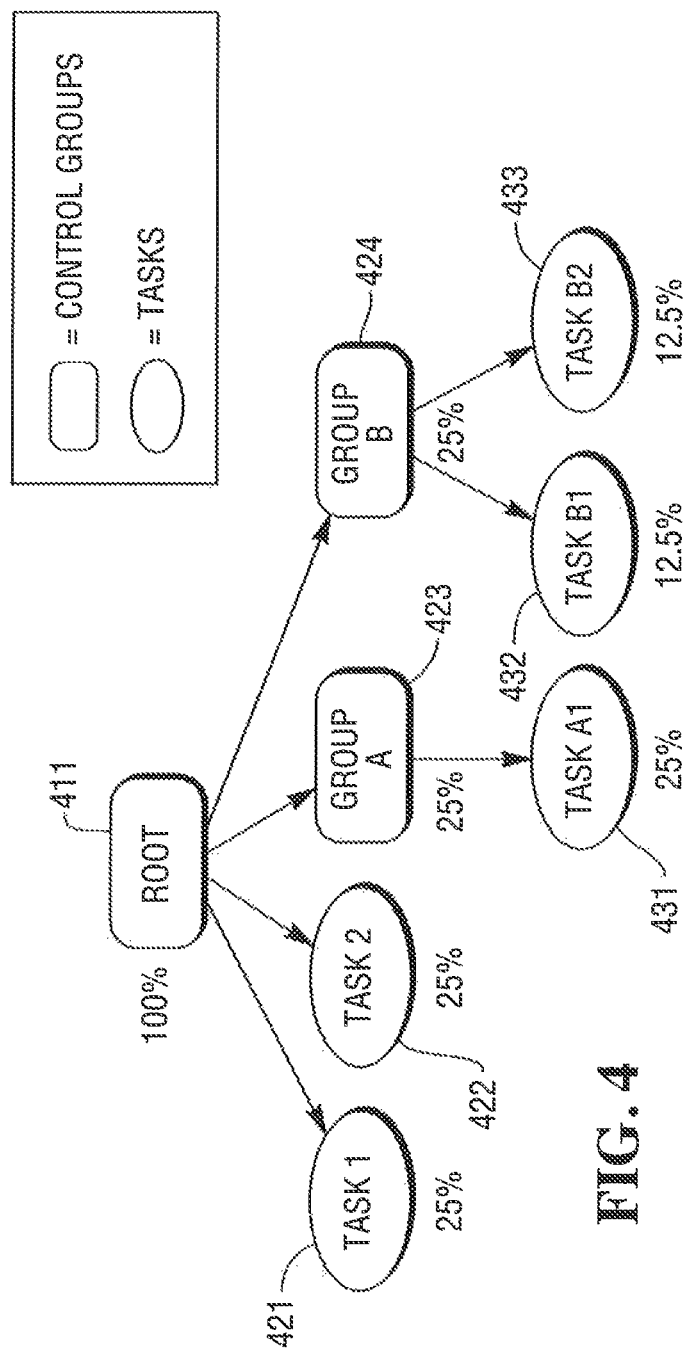
FIG. 4 illustrates a simple control group tree.

Control groups can give rise to additional control groups below them, which may contain their own hierarchies. FIG. 4 illustrates a simple control group tree.

Each request running on a Teradata Database node will have multiple tasks, for example, one per AMP, that need to be recognized and prioritized as a unit.

Conceptually, resources flow within this Linux tree structure from the top of the control group hierarchy to the bottom, with resources allocated equally among the groups of tasks that fall under a control group. For example, four tasks or task groups, Task 1, Task 2, Group A, and Group B, identified by reference numerals 421, 422, 423, and 424, respectively, are shown one level below Root Group 411, and each receive a resource allocation of 25% of the parent group 401. As Group A 423 contains a single Task, Task A1, identified by reference numeral 431, this task receives the full allocation of Group A, i.e., 25%. Group B contains two tasks, Task B1 and Task B2, identified by reference numerals 432 and 433, respectively, which each receive one half of the resource allocations for Group B, i.e., 12.5%. Such a control group tree provides a blueprint for how resources will flow through the system. The tree represents the plan for how the differently prioritized entities will share resources among them.

Figure 5:
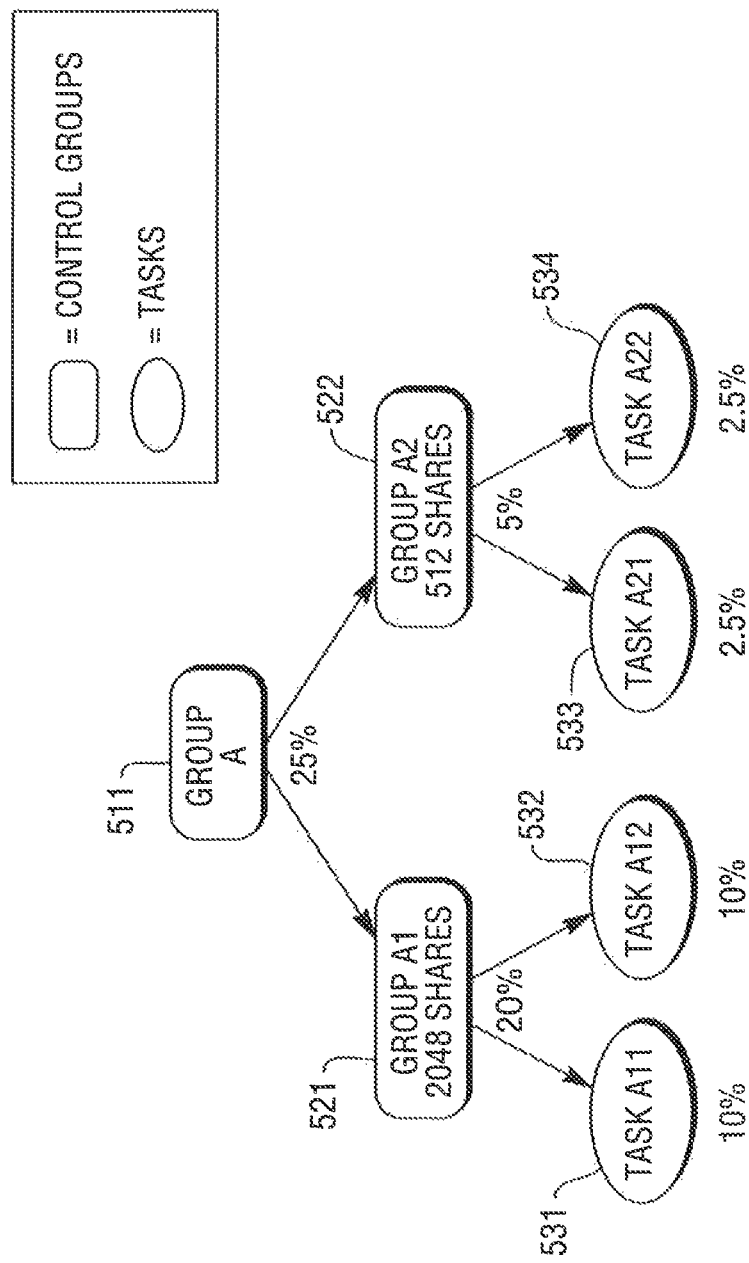
FIG. 5 illustrates a more complex control group hierarchy.

FIG. 5 illustrates a more complex combination of control groups and tasks. In the control group hierarchy shown in FIG. 5, Group A, identified by reference numeral 511 has a total allocation of 2560 "shares" or 25% of resources. In Linux SLES 11, numbers called "shares" determine the portion of resources that will be made available to a control group compared to everything else under that parent at that level. If there is only one control group or task at a given level, it will receive 100% of what flows down to that level from the level above. Shares override the default state of giving all children under a parent an equal share. Shares are a mechanism to represent priority and will be discussed in the next section. Notice that the Control Group A1, identified by reference numeral 521, has been assigned 2048 shares or a 20% allocation of resources, while Control Group A2, identified by reference numeral 522, has been given 512 shares or 5% a 5% allocation of resources.

Within Group A1 (reference number 521), Task A11 (reference number 531) and Task A12 (reference number 532) each receive 10% allocations. Similarly, within Group A2 (reference number 522), Task A21 (reference number 533) and Task A22 (reference number 534) each receive 2.5% allocations. The different allocations to Groups A1, wherein Task A11+Task A12=20% of the resources, and Group A2, wherein Task A21 and Task A22=5% of the resources, is determined from operating system priorities as defined when the tree was constructed.

Shares can be assigned to control groups using basic operating system commands. However, the Teradata Priority Scheduler manages the share assignments for the control groups representing Teradata Database work, based on choices made by the administrator at setup time. High priority workloads will be represented by control groups with a greater number of shares compared to low priority workloads.

Shares are simply numbers that when compared to other similar numbers reflect differences in priority of access to CPU to the operating system. When an administrator, or external program such as Teradata Priority Scheduler, applies a different number of shares to different control groups at the same level in the tree structure, as shown in FIG. 5, then that will influence priority differences for the tasks within those control groups.

In the example above, the administrator assigned 2048 shares to the Control Group A1 (reference number 521) and 512 shares to Control Group A2 (reference number 522), setting up a 4:1 ratio difference in priority for the tasks running in those groups. That leads to the tasks within those two groups receiving a 4:1 ratio in runtime access to resources.

The Completely Fair Scheduler recognizes and supports differences in priority based on:
1. Level in the hierarchy, and
2. The number of assigned shares and their relative value compared to other groups or tasks under the same parent.

At runtime shares are used to determine the weight, or importance, given to a group of tasks, or to an individual task. This weight is used in conjunction with other details to determine which task is the most deserving to receive CPU next. The Linux scheduler makes this decision of what task to run next by means of a different kind of internal tree, called a red-black tree.

Tasks that are waiting for CPU are maintained internally within a red-black tree structure—a self-balancing binary search tree, popular in computing science to organize pieces of comparable data. One advantage of a red-black tree is that it comes with some restrictions on height, making it highly efficient for searches, inserts, deletions, or any changes. Red-black trees are well-suited for making quick operating system decisions in a dynamic environment. There are many red-black tree structures that support the complex decision-making going on inside the operating system, one for each set of parent and children in the hierarchy.

Each local red-black tree has a node for each active task or groups of tasks under a single parent. In addition there will be one different set of red-black trees for each CPU on the node. Any given task will only be present in one red-black tree structure.

Position in the red-black tree changes quickly because the scheduler is always trying to put the most deserving task or control group into the leftmost position in the tree. Whoever is in the leftmost position runs next on that CPU. If it is a task, the task runs. If the leftmost node in the red-black tree is a control group, the most deserving task underneath that control group will run. The most deserving task is determined based on the local red-black tree that is managing all the tasks under that control group.

These tasks and control groups are sorted within the operating system's red-black tree structures based on their weight (as represented by their operating system shares), as well as how much time they have already spent on the CPU. The entity that combines these two factors (weight and CPU time used), and that controls the position in the red-black tree is known as the virtual runtime of a task.

A virtual runtime is calculated for each control group or each task that is waiting for CPU, based on the weight of a task alongside of the amount of CPU it has already been given.

Virtual runtime of a task or control group is only comparable to the virtual runtime of the other tasks or control groups under the same parent.

Both workloads and the requests under them are control groups. Control groups are components that carry priority and that are assigned shares. Request control groups divide the resources to which their shares entitle them equally among their children (the tasks supporting the request). Tasks do not have an assigned share as do control groups, but equally divide up what is made available to their parent.

In general, virtual runtime for a task is determined by dividing the number of CPU seconds that the task has spent on the CPU already by its portion of the shares that were assigned to the request to which it belongs. If this were part of a Teradata Database request, the number of shares assigned to the request would depend on how its workload priority was established by the administrator.

The contrast in different tasks' virtual runtimes in the red-black tree will influence not only which task will run next, but how long a given task will be allowed to run, once it is given access to CPU. If its virtual runtime is very low compared to the virtual runtimes of other tasks waiting to run, it will be given proportionally more time on the CPU, in an effort to get all virtual runtimes to be equal. This is a fundamental goal of the Linux Completely Fair Scheduler.

The operating system scheduler tries to reach an ideal plateau where no single task is out of balance with what it deserves. Teradata Priority Scheduler provides input based on DBA settings that will be used to determine a task or a control group's weight, based on such things as the workload where the task is running and its level in the control group hierarchy, as well as the share percent the administrator has assigned the workload. These concepts will be discussed later in this orange book.

Each CPU tries to service the neediest task first, allowing the tasks with the lowest virtual runtime to execute before others. Virtual runtime accounting is at the nanosecond level, well below a millisecond. Determining what runs next is where the Linux Completely Fair Scheduler name most applies: The Completely Fair Scheduler always tries to split up CPU time between candidate tasks as close to "ideal multitasking hardware" as possible. This is truly novel in the history of operating systems and is the key contributing factor in the predictability of the new SLES 11 Priority Scheduler.

Teradata Priority Scheduler

The new Teradata Priority Scheduler offers a simpler and a more effective approach to managing resources compared to the previous facility. It utilizes the control group structure inherent in the Linux SLES 11 Completely Fair Scheduler to organize the various priority constructs. Because it is so closely aligned with the core features of the underlying operating system, the new Teradata Priority Scheduler provides greater flexibility and power than what came before.

The SLES 11 Priority Scheduler is workload-based. While the previous Priority Scheduler linked Teradata Active System Management workloads to Priority Scheduler performance groups under the covers, here the "workload" becomes the priority object visible to the operating system. Once the workload is properly defined, the operating system will treat the workload as something it is intimately familiar with—just another control group.

Figure 6:
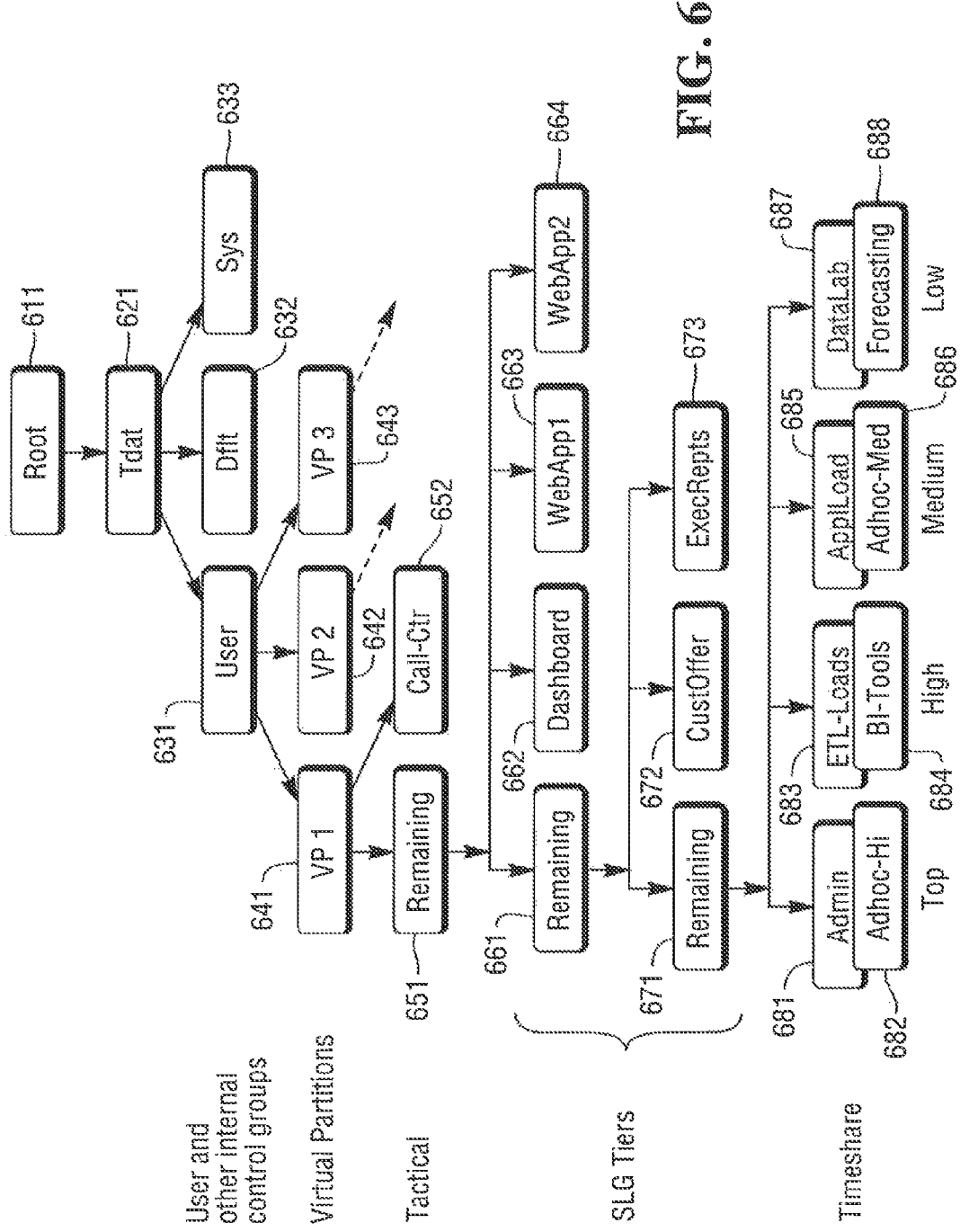
FIG. 6 illustrates an example of a task group hierarchy defining different priority levels in accordance with the present invention.

FIG. 6 illustrates an example of how the Priority Scheduler builds on the control group concept to define different priority levels.

Consider the detail displayed in FIG. 6. All of the tasks generated in the Teradata Database will be managed by control groups that exist under the high-level Tdat control group 621. Critical internal tasks and activities will execute in the Sys control group 633 and Dflt control group 632 immediately under Tdat 621. They are expected to use very little resource, allowing all the remaining resources to flow to everything that is underneath control group 631 named User. The User control group 631 is the starting point for a hierarchy of virtual partitions and workloads that will support Teradata Database work.

Conceptually, resources flow from the top of this tree down through the lower levels. Control groups and their tasks at the higher levels will have their resource needs satisfied before control groups and their tasks at lower levels.

Using a tool such as Teradata Corporation Workload Designer, a database administrator (DBA) will indicate where in this already-established tree structure each workload will be located. More important workloads will be assigned higher, in the Tactical and Service Level Goal (SLG) Tiers, and less important workloads will be assigned lower, in the Timeshare level. Each defined workload will be instantiated in the hierarchy as a control group.

Notice that below the virtual partition level, at the Tactical and SLG levels, there is a control group or workload labeled "Remaining". This is an internally-created workload whose sole purpose is to be a conduit for resources that are intended for the levels below. Resources assigned to workloads on that tier that are unable to be used at that level will flow through Remaining to the workloads in the level below.

For example, on the Tactical level there is a tactical workload 652 named Call-Ctr. A second workload, Remaining workload 651, is automatically defined on the same level, without the administrator having to explicitly define the group. All of the resources that Call-Ctr workload 652 cannot consume will flow to Remaining workload 651 at that level. Remaining workload 651 acts as a parent and passes the resources to the next level below. Without the Remaining workload, workloads in the levels below would have no way to receive resources.

Figure 7:
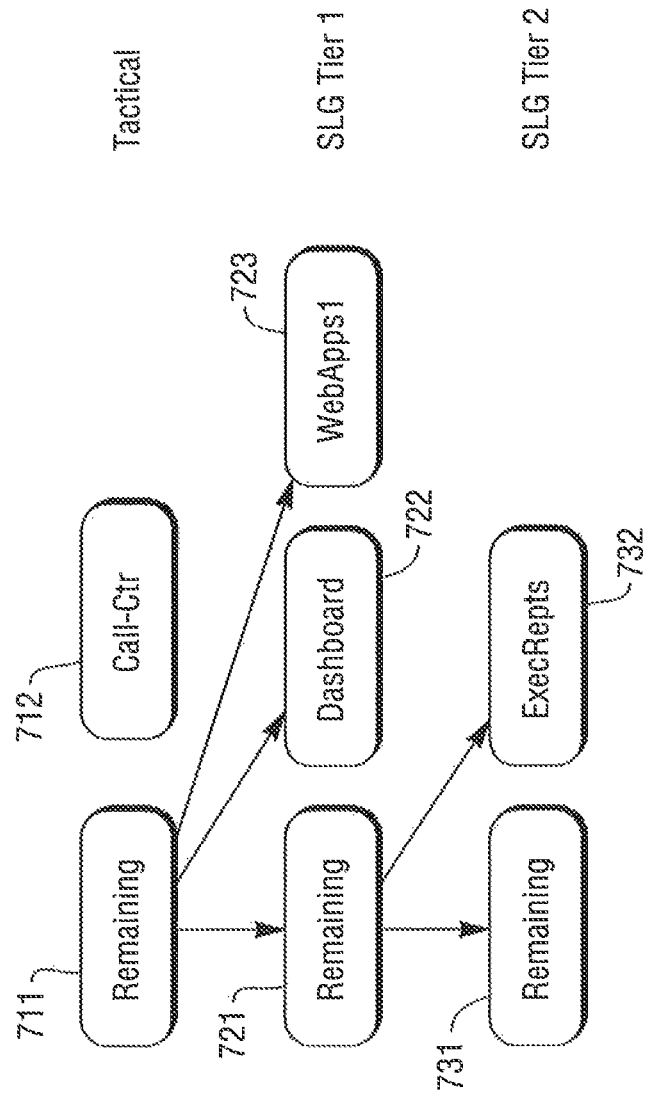
FIG. 7 provides a simple illustration of the use of the workload labeled Remaining to pass database system resources to lower tiers in the task group hierarchy.

FIG. 7 provides a simpler illustration of the use of the workload labeled Remaining, showing only the relevant levels of the hierarchical tree illustrated in FIG. 6. Referring to FIG. 7, on the Tactical level there is a tactical workload 712 named Call-Ctr. A second workload, Remaining workload 711, is automatically defined on the Tactical level. All of the resources that Call-Ctr workload 712 cannot consume will flow to Remaining workload 711 at that level. Remaining workload 711 acts as a parent and passes the resources to the next level below, SLG Tier 1, which includes Dashboard and WebApps1 workloads 722 and 723, respectively. Remaining workload 731 receives all resources at the SLG Tier 1 level which are not consumed by workloads 722 and 723. Likewise, Remaining workload 721 passes resources to the Remaining workload 731 and workload ExecRepts 732 at the SLG Tier 2 level.

Virtual partitions, (VPs) 641, 642, and 643, shown in FIG. 6, are somewhat similar to resource partitions in the previous Priority Scheduler. In the control group hierarchy, VPs are nodes that sit above and act as a collection point and aggregator for all or a subset of the workloads.

A single VP exists for user work by default, but up to ten VPs may be defined, if needed. Due to improvements in Priority Scheduler capabilities, a single VP is expected to be adequate to support most priority setups. Multiple VPs are intended for platforms supporting several distinct business units or geographic entities that require strict separation.

VPs provide the ability to manage resources for groups of workloads dedicated to specific divisions of the business. When a new VP is defined, the administrator will be prompted to define a percentage of the Teradata Database resources that will be targeted for each, from the Viewpoint Workload Designer screens. This percent represents the percent of resources that will be allocated to that VP from what flows down through the User control group.

Figure 8:
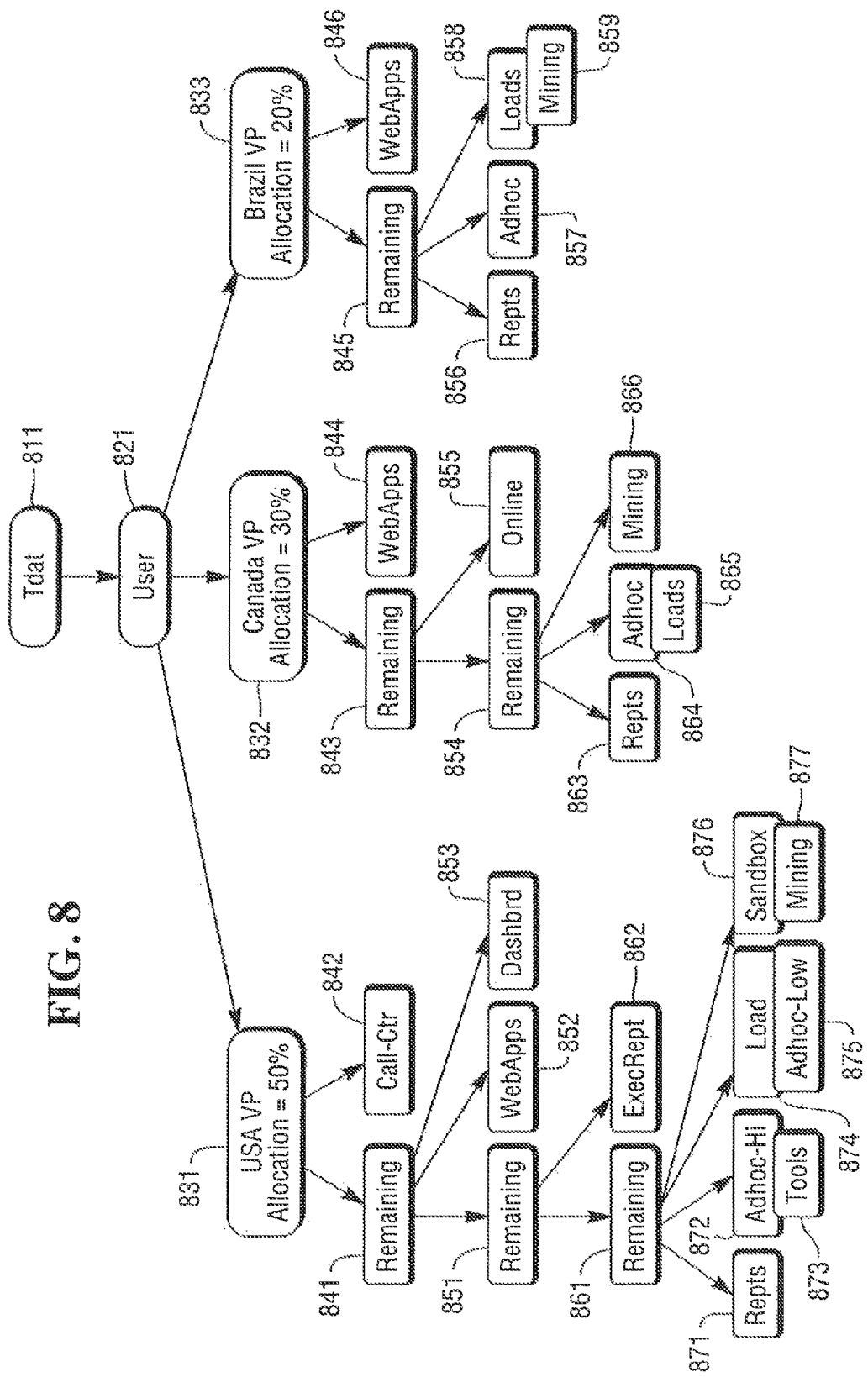
FIG. 8 provides an illustration of task group hierarchies organized under multiple virtual partitions.

Once defined, each of these VPs can contain their own control group hierarchies. Each VP hierarchy can include all allowable priority levels from Tactical to Timeshare, as shown in FIG. 8. Three virtual partitions are shown, USA VP 831, Canada VP 832, and Brazil VP 833, each VP including Tactical, SLG, and Timeshare priority levels.

A feature of the SLES 11 Teradata Priority Scheduler allows a hard limit to be set on how much resource can be consumed by a VP. Without the hard limit specified, a virtual partition is considered to be "dynamic". If the hard limit is specified, the VP becomes "fixed" and that same percent that represents the VP allocation becomes an upper limit of resource consumption.

If a VP is dynamic and there are spare cycles not able to be used within another VP, the VP will be allowed to consume more than its defined percent specifies.

Workloads that specify a workload management method of "tactical" are in the level the under the VPs. The tactical level is intended for workloads that represent highly-tuned very short requests that have to finish as quickly as possible, even at the expense of other work in the system. An example of a tactical workload is one that is composed of single-AMP or very short few-step all-AMP queries. Workloads identified by the administrator as tactical will receive the highest priority available to user work, and will be allowed to consume whatever level of CPU within their VP that they require.

Workloads on the Tactical level will have several special benefits: Tactical workloads are automatically run with an expedited status, which will give queries running in the workload access to special pools of reserved AMP worker tasks if such reserves are defined, and provides them with other internal performance boosts. In addition, tasks running in a tactical workload are able to more easily preempt the CPU from other tasks running in the same or in a different VP, due to their higher operating system weight.

If tactical requests are so resource-intensive that they are able to consume almost all the platform resources, then very little resource will fall to the lower levels. It is recommended that workloads only be placed on the Tactical level if they are very slight consumers of resource, such as single-AMP requests, as the architecture of the new Priority Scheduler is built around the concept that the majority of resources will fall through from Tactical to the levels below.

There may be one or up to five levels in the hierarchy between the Tactical and Timeshare levels. These "SLG Tier" levels are intended for workloads associated with a service level goal, or other complex tactical or non-tactical work whose response time is critical to the business. It may be that only a single SLG Tier will be adequate to satisfy this non-tactical, yet time-dependent work.

If more than one SLG Tier is assigned workloads, the higher tiers will have their workload requirements met more fully than workloads on the lower tiers. Workloads in Tier 1 will always be serviced ahead of workloads in Tier 2; Tier 2 will be serviced before Tier 3, and so forth.

Each tier will automatically be provided with a Remaining workload. This workload acts as a conduit for resources that come into that tier and are intended to flow down to the tier below. Resources flow downward to the next tier either because they are not able to be used by workloads on the current tier or have been set aside for the tiers below. This workload is referred to as "Remaining" because it represents the resources remaining after workloads on a given tier have been provided with their defined percent of tier resources.

Each SLG Tier can support multiple workloads. A workload allocation is specified by the DBA when a workload is assigned to a particular SLG Tier. The workload allocation represents the percent of the resources that the administrator would like to target to that particular workload from within the resources that are made available to that tier. In other words, the workload allocation is a percent of that tier's available resources, not a percent of system resources, and not a percent of VP resources.

Figure 9:
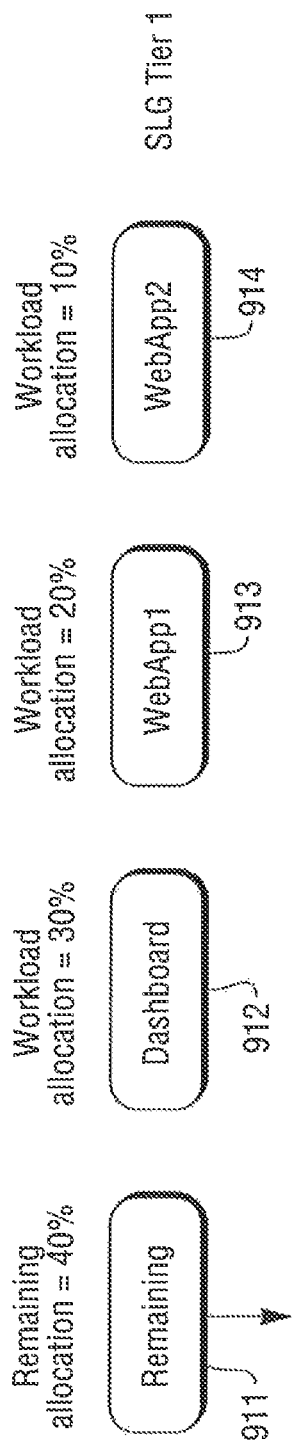
FIG. 9 illustrates workload resource allocations within a task group tier, and the determination of resources allocated to the Remaining workload within the task group tier.

Each workload in an SLG Tier will carry a workload allocation, also known as a workload share percent, which represents the percent of the resources intended for the workload among the resources that flow into the SLG tier. FIG. 9 provides an illustration of workload allocations at an SLG tier, wherein the tier's available resources are allocated at 30%, 20%, and 10% to workloads 912, 913, and 914, respectively. The Remaining workload 911 is automatically given a 40% workload allocation behind the scenes. The allocation percentage given to the Remaining workload is equal to the sum of the standard workload allocations on the SLG tier subtracted from 100%. The Remaining workload's allocation percent represents the share of the resources flowing into the tier that will be unconditionally directed to the tiers and levels below. In FIG. 9, the sum of workload allocations 912, 913, and 914 is 60%. Since 100%−60%=40%, the Remaining workload is automatically assigned a workload allocation of 40%. This guarantees that a minimum of 40% of the resources that flow into that SLG Tier will be available to workloads below.

Concurrency within a workload will make a difference to what each task is given on the SLG Tiers. All of the requests active within a given workload will share equally in the workload allocation that workload is assigned. If a single request is active within an SLG Tier workload, the entire workload allocation will be available to that one request. However, if there are five requests active in the workload, each request will receive approximately ⅕ of the workload allocation.

The workload allocation is not an upper limit. If more resources are available after satisfying the allocations of other workloads on the same tier and the tiers below, then an SLG Tier workload may be offered more resources. Under some conditions, a workload throttle may be appropriate for maintaining more consistent resource levels for requests within high concurrency workloads on an SLG Tier.

By default, the automatically-created workload called Remaining on each SLG Tier will always have a few percentage points as its workload allocation. This ensures that all levels in the hierarchy will have some amount of resources available to run, even if it is small amount.

The Remaining workload will typically end up with a larger value for its allocation than this minimum, however. When workloads are added to an SLG Tier, the total of their workload allocations will be subtracted from 100%, and that is the percent that Remaining will be granted. This happens automatically without the user having to do anything. If additional workloads are added to the tier later, their workload allocation will further take away from the allocation of Remaining, until such time as a minimum allocation for Remaining is reached.

Figure 10:
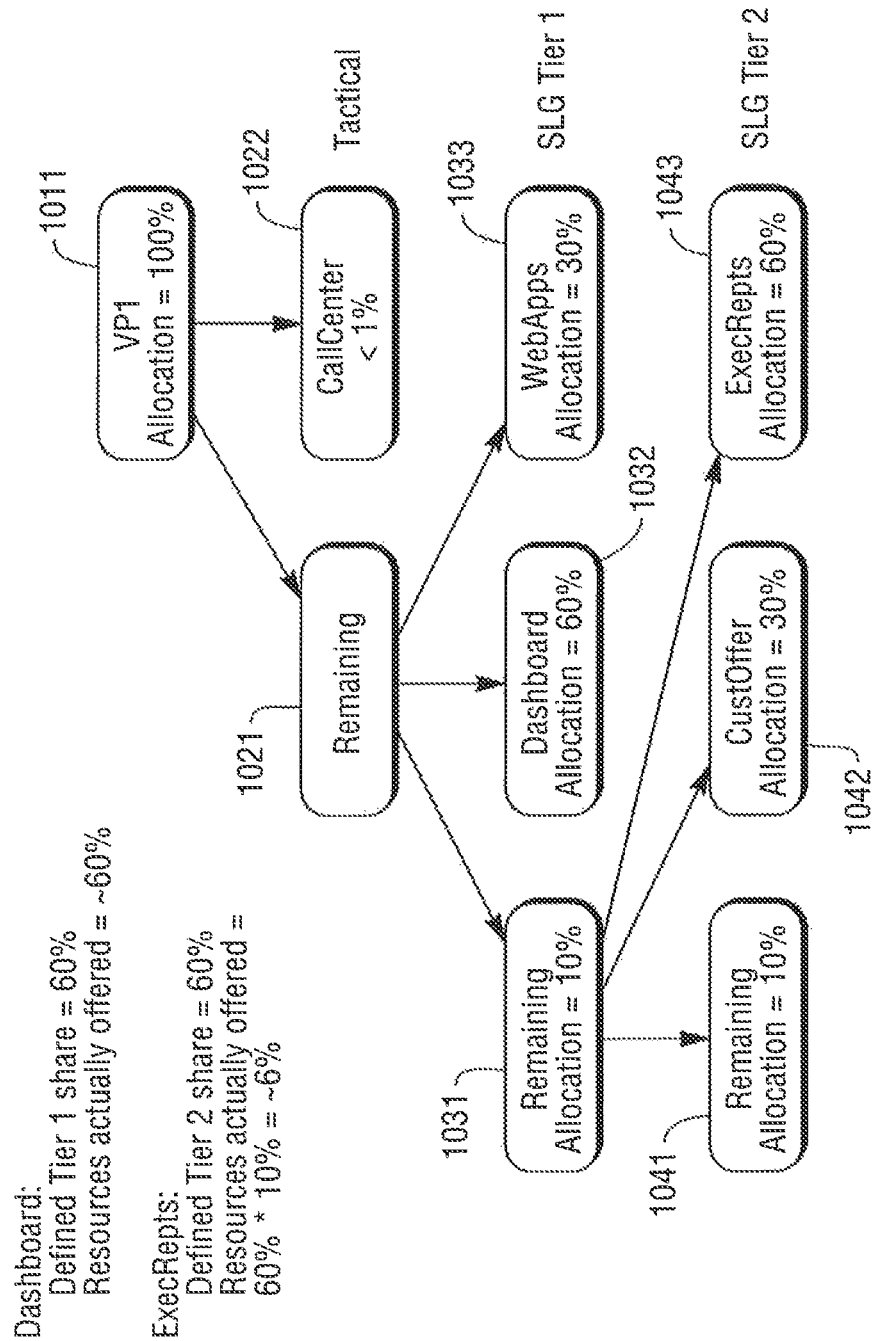
FIG. 10 provides a first illustration of a task group hierarchy wherein the allocation of resources among task groups within higher tier levels limits the amount of resources available to task groups within lower tier levels.

To illustrate the importance of tier position in a busy system, consider the approach shown in FIG. 10. In this example, the high workload allocations provided to workloads 1032 and 1033, 60% and 30%, respectively, in SLG Tier 1 may prevent workloads in SLG Tier 2 and lower tiers from receiving adequate resources.

In the example shown in FIG. 10, both SLG Tier 1 and SLG Tier 2 workloads have workload allocations that sum up to 90%, leaving Remaining workload 1031 on SLG Tier 1, and Remaining workload 1041 on SLG Tier 2, with 10% resource allocations. However, the level of resources at the system level that the workloads on each tier are offered may be quite different.

Note that both Dashboard workload 1032 on SLG Tier 1 and ExecRepts workload 1043 on SLG Tier 2 have the same workload allocations, 60%, but the workloads themselves are assigned to different tiers. If there is little or no tactical work then Dashboard workload 1032 on SLG Tier 1 could get access to close to 60% of the resources of the node. That is not likely to be true for ExecRepts workload 1043 on SLG Tier 2, even though its workload allocation is the same.

If both Dashboard workload 1032 and WebApps workload 1033 on SLG Tier 1 are using their full allocations of 60% and 30%, respectively, only 10% of the resources that are available to SLG Tier 1 would fall through to SLG Tier 2. So even though ExecRepts workload 1043 on SLG Tier 2 has been given the same workload allocation as Dashboard workload 1032 on SLG Tier 1, ExecRepts workload 1043 will get approximately 60%*10% or approximately 6% of the resources of the node, if all workloads are consuming up to their assigned allocations.

Database administrators should be cautious about giving high workload allocations to workloads in the higher SLG Tiers. An approach that specifies high workload allocations on the SLG Tiers, as shown in FIG. 10, may end up starving the work in the Timeshare level, if in fact consumption of the different tier workloads actually reaches their specified allocations. It could also deprive SLG Tiers that are lower in the hierarchy from getting a reasonable level of resource.

Figure 11:
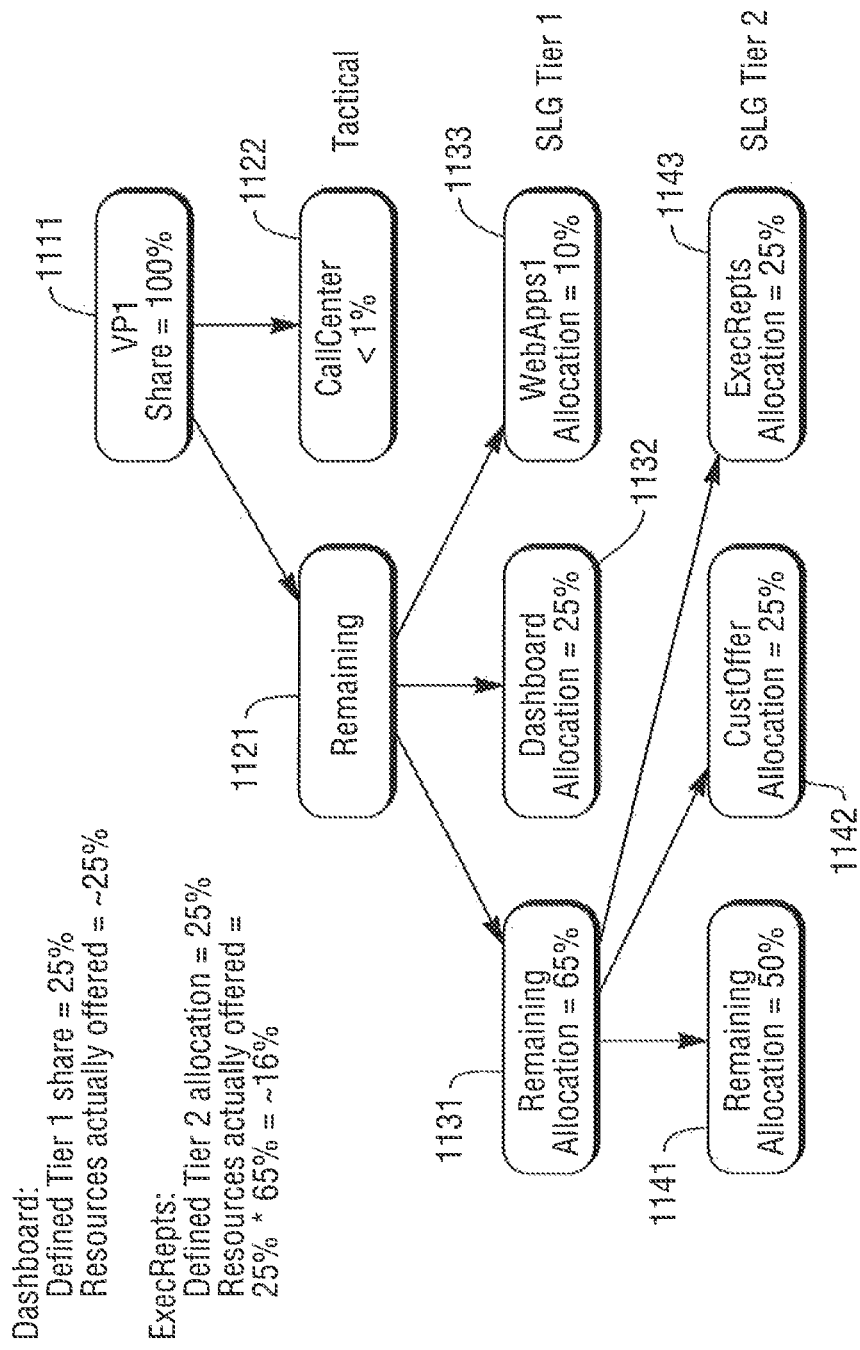
FIG. 11 provides a second illustration of a task group hierarchy wherein a moderate allocation of resources among task groups within higher tier levels allows for a greater allocation of resources to task groups within lower tier levels.

FIG. 11 shows similar setup as shown in FIG. 10 above, revised with more moderate workload allocations in the SLG Tier workloads.

In FIG. 11, while Dashboard workload 1132 on SLG Tier 1 and ExecRepts workload 1143 on SLG Tier 2 have the same workload allocations, their difference between how much resource they will be offered does not differ dramatically, (25% for workload 1132 vs. 16% for workload 1143). In addition, there is more resource available to flow to the tiers below SLG Tier 2.

SLG tiers should be set up to balance the workload allocation assignments on the tier levels with the needs of the workloads that exist in lower tiers.

When a workload on an SLG Tier has no active tasks, its definition and defined workload allocation remain intact, but the control group that represents the inactive workload will temporarily be excluded from the internal calculations of operating system shares.

Figure 12:
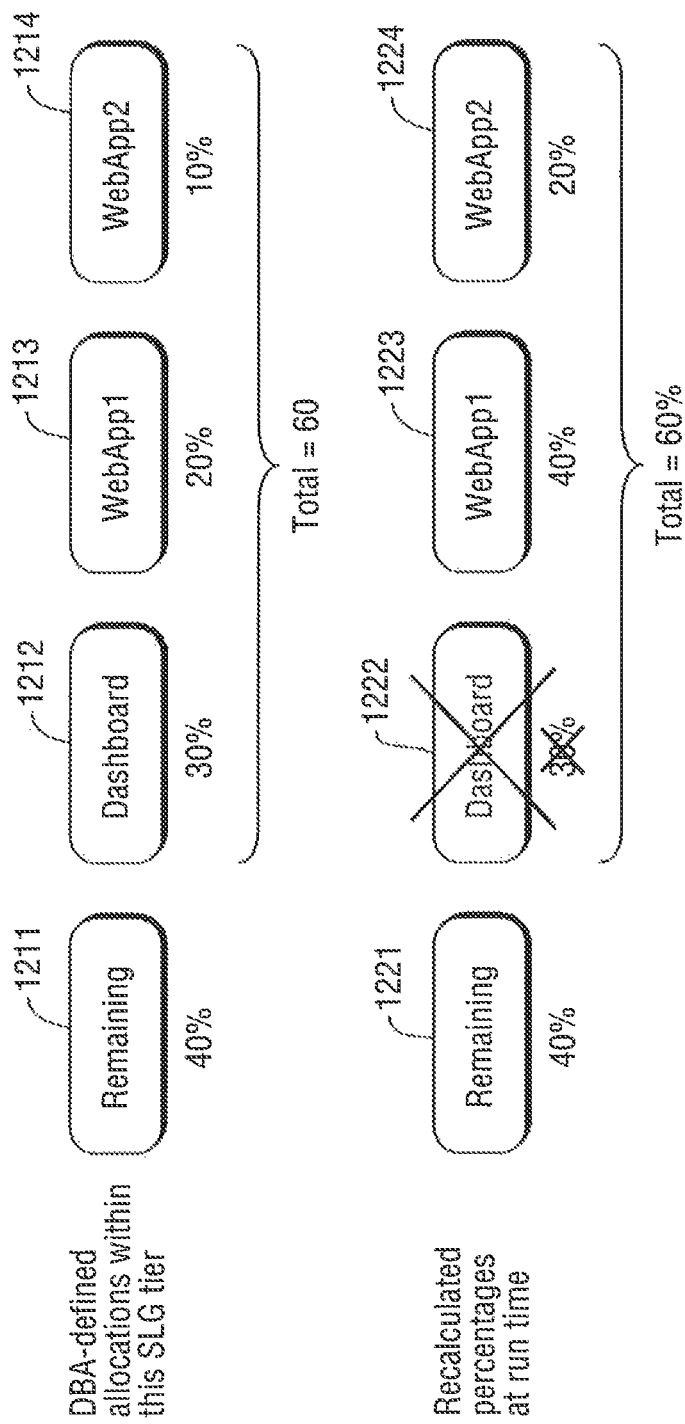
FIG. 12 illustrates one method of reallocating resources among sibling task groups when a task group is inactive.

Sibling workloads, i.e., workloads on the same tier, will be offered the unused resources originally allocated to the inactive workload. Only if those workloads are unable to use that resource will it flow through the tier level Remaining workload to the tier below. FIG. 12 provides an example of three workloads, 1212, 1213, 1214, on a single SLG Tier. When one workload, workload 1222, becomes inactive, sibling workloads 1223 and 1224 will be offered the 30% of resources originally allocated to workload 1212. The resources offered to workload 1213/1223 increases from 20% to 40%, and the resources offered to workload 1214/1224 increases from 10% to 20%. Note that the allocation assigned to Remaining workload 1211/1221 remains the same, and that only the user-created workloads 1213/1223 and 1214/1224 temporarily experience a boost in their allocations.

The following steps can be utilized to understand the impact of a workload being inactive on an SLG Tier:
1. Determine the sum of all the workload allocation values for all workloads on the tier. This is the amount of resource that will shared among the active workloads, even when one or more of the workloads becomes inactive, e.g., FIG. 12, workloads 1212, 1213, and 1214: 30%+20%+10%=60%.
2. Consider the individual workload allocations of only the active workloads. The relative relationship among the active workload's allocations indicates how the 60% share of resources targeted to the workloads on the tier will be divided up amongst the active workloads. In FIG. 12:
   Workloads 1213 and 1214: 20%+10%=30% (total of active workload allocations);
   Workload 1213: 20%/30%=66.6% (percent of 60% that WebApp1 will receive); and
   Workload 1214: 10%/30%=33.3% (percent of 60% that WebApp2 will receive).
3. Multiply the relative allocations calculated in Step 2 by the available resource share calculated in Step 1 to get the run time workload allocation when one or more workloads on the tier are inactive:
   WebApp1 (1213/1223) new share: 20/30=66.6%; 66.6%*60%=40%;
   WebApp2 (1214/1224) new share: 10/30=33.3%; 33.3%*60%=20%,
   Remaining workload (1211/1221) share is unchanged: 40%.

Because the sibling workloads share in the unused resources, it is sometimes possible to take advantage of this and set allocations for the individual SLG Tier workloads lower than each theoretically requires. This would be practical only if activity among the sibling workloads hit high usage at different times of day. For example, the time when Dashboard workload 1212/1222 is very busy, WebApp1 workload 1213/1223 and WebApp2 workload 1214/1224 are less busy or inactive. If all sibling workloads are active at peak levels at the same time then it is recommended that they be given allocations equivalent to their individual needs.

It is important to note that the Remaining workload, which is the conduit for resources flowing to the lower levels, will not experience an increase in its allocation when there are inactive workloads on a tier, unless the active workloads are not able to consume the additional resources they are offered. Resources from inactive or under-consuming workloads flow to the other workloads on the tier first, and only go to Remaining if they cannot be consumed anywhere else on the tier.

When the administrator makes associations between workloads and SLG Tiers, the percent specified for a given workload allocation is always a percent relative to what the tier receives. It is often useful to understand what this workload allocation translates to system-wide.

The system-wide percent you can expect a workload to be offered is more appropriately understood as the "node-level" allocation. This is because Priority Scheduler operates independently on each node in the configuration.

Figure 13:
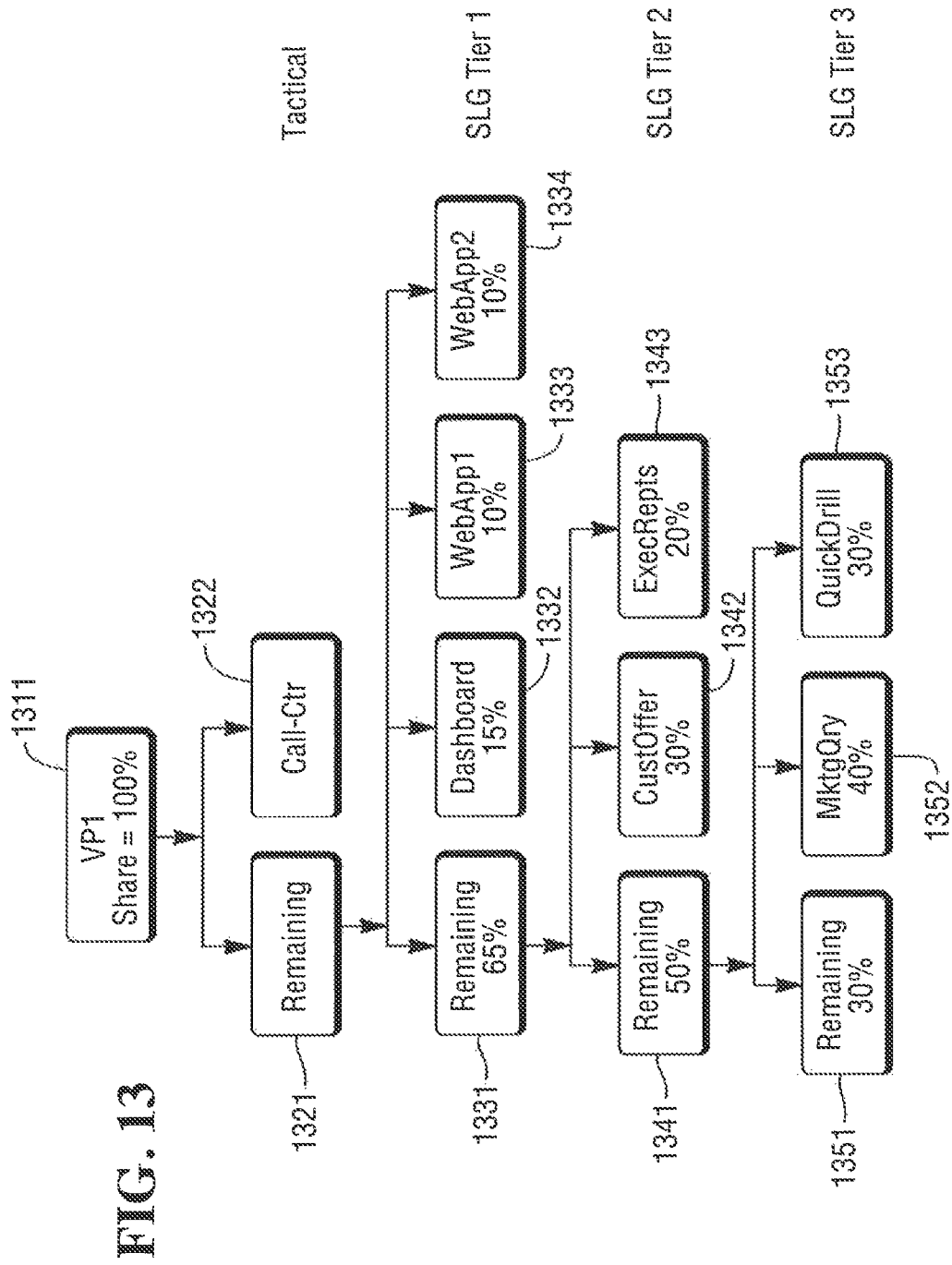
FIG. 13 is an illustration of a task group hierarchy for use in explaining the determination of node-level allocations to task groups.

The hierarchy shown in FIG. 13 illustrates a simple setup similar to FIG. 6 shown earlier, but with three SLG Tiers. This partial priority hierarchy will act as the starting point in understanding how to determine the level of resources that will be allocated to a workload from the node perspective.

Node-level allocation for a specific workload can be determined by, beginning with the specific workload, traversing upwards in the hierarchy, multiplying the workload allocation by the allocation of each parent that is encountered. For workloads on the lower tiers, the parent will be the Remaining workload of the next tier above. If there are multiple VPs active, it would also be necessary to multiply by the VP allocation of which the specific workload is a descendent.

Figure 14:
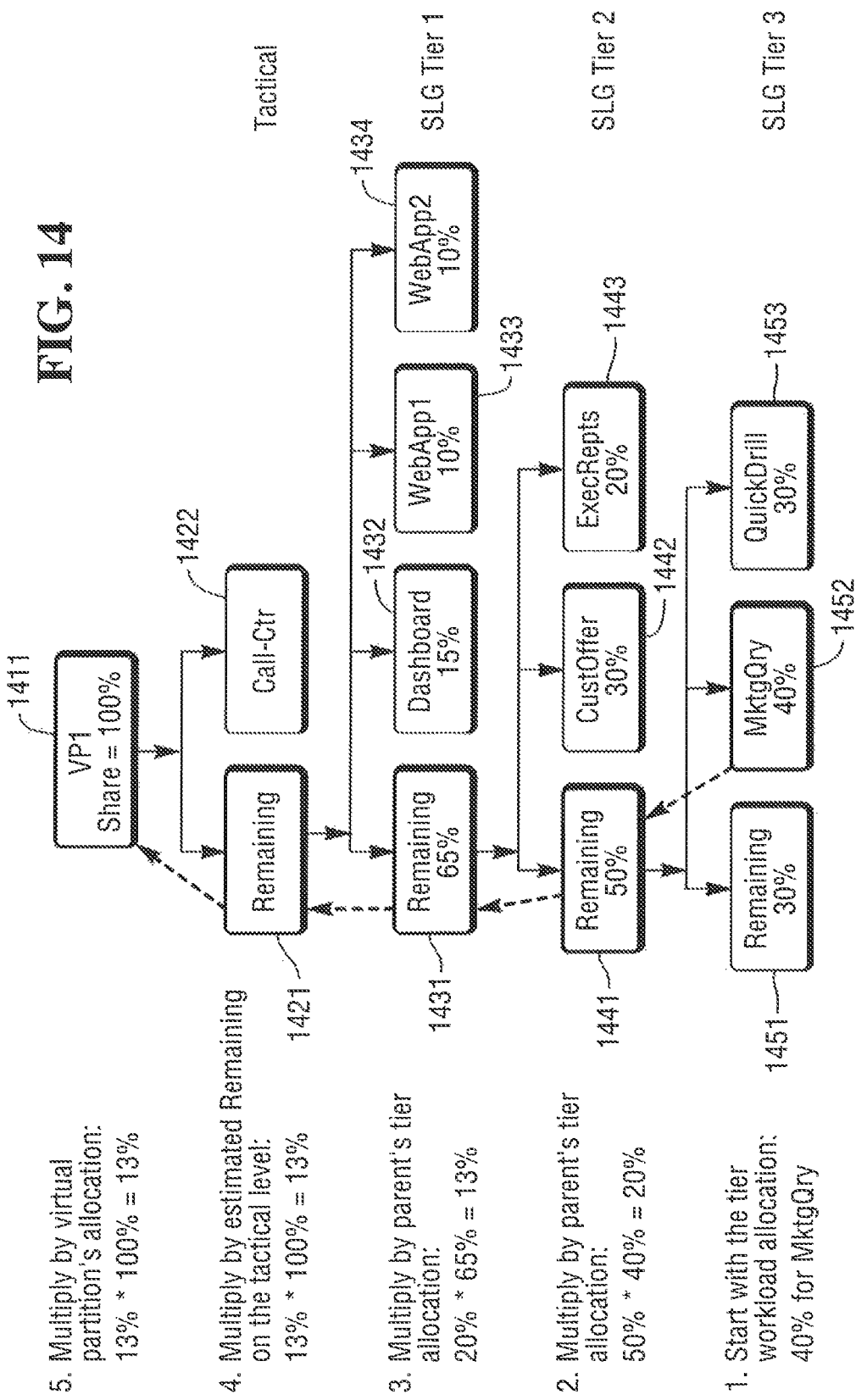
FIG. 14 illustrates the calculation of node-level allocations utilizing the example hierarchy of FIG. 13.

Referring to FIG. 14, the node percent that will be targeted to the MktgQry workload 1352 on SLG Tier 3, which has a workload allocation of 40% on SLG Tier 3, can be determined from the following formula: 40% (workload 1352 Tier 3 allocation)*50% (Remaining workload 1341 Tier 2 allocation)*65% (Remaining workload 1331 Tier 1 Remaining allocation)*100% (estimated Tactical level Remaining workload 1320 allocation)*100% (VP1)=13%.

The result of the translation exercise illustrated in FIG. 14 provides an estimate of how much of a node's resource will be made available to this workload if all workloads on all tiers are active, and all workloads in the tiers above are consuming their complete allocation. Because of all these dependencies, it should not be expected that actual workload consumption will equal the estimate of node percent.

A workload is likely to consume a level of resources that is quite different from its estimated node percent. Contributing factors include: other active VPs use of resources, consumption of more or less than expected resources by workloads in the Tactical level, sibling workloads use of allocated resources, inactive workloads on the same tier, the workload's inability to use all the resources it has been allocated, and the ability of workloads in the Timeshare level to consume all resources that flow to them.

Virtual runtime in Linux SLES 11 was described above as the mechanism to determine which task ran next on a given CPU. That is, the task with the lowest virtual runtime in the red-black tree is considered the most needy, the most deserving, and will run next. CPU seconds already used to get the work done will be divided by the operating system shares. The larger the divisor (the shares), the more needy the task will appear to the operating system.

Figure 15:
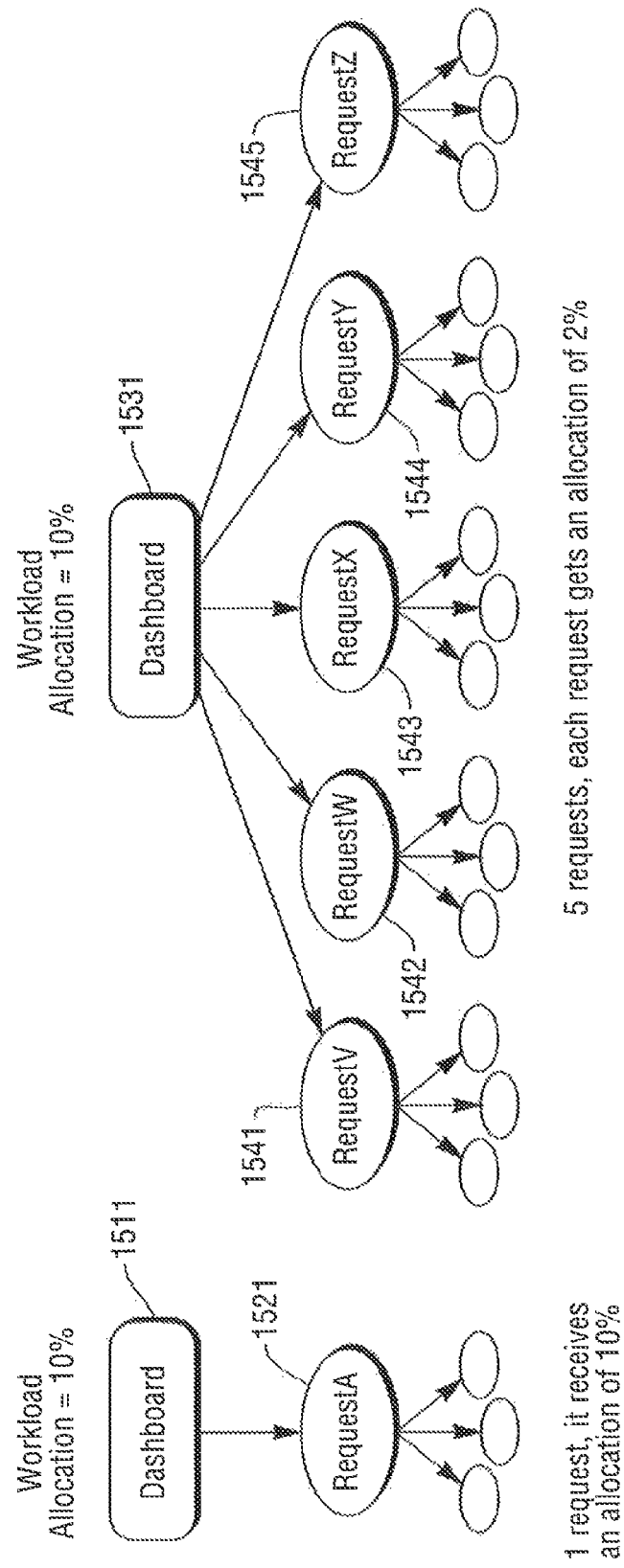
FIG. 15 illustrates the allocation of database system resources to tasks within a task group or workload.

However, allocations for SLG Tier workloads are divided up among all of the active tasks under that workload on that node, as illustrated in FIG. 15. If only a single request 1521 is active within a given SLG Tier workload 1511, having an allocation of 10%, then that single request will experience a somewhat higher priority (lower virtual runtime) because its tasks will be given the entire allocation to which the workload is entitled, i.e., 10%. The more requests running concurrently in an SLG Tier workload, the fewer shares each will receive. For example, the five requests 1541-1545 within workload

1531 will each receive a 2% allocation, ⅕ of the 10% allocation provided for workload 1531.

SLG Tiers are intended to support high priority work, especially work that has service level expectations that are important to the business. The tier structure provides the foundation for multiple high priority workloads to be serviced predictably, based on their importance, beyond just the well-tuned tactical.

While the Tactical level is the right place for extremely response-sensitive work, such as single-AMP queries, SLG Tier 1 is a good place for all-AMP tactical work that is somewhat more complex and resource intensive than the Tactical level. Work in the tier directly under Tactical (SLG Tier 1) is expected to receive close to its full allocation of resources.

Lower SLG Tier levels are appropriate for non-tactical SLG work that is critical to the business. If there are a larger number of such workloads, the more important workloads should be placed in higher SLG Tiers, and less important workloads in the lower SLG tiers. The fewer SLG tiers utilized, the more consistency can be expect across tiers. Considerations for using multiple SLG tiers are presented below in Table 1.

TABLE 1

Considerations for using multiple SLG Tiers.

| Use one SLG Tier . . . | Use two SLG Tiers . . . | Use more SLG Tiers . . . |
|---|---|---|
| If only all-AMP tactical workloads are being supported in the SLG Tiers | When supporting both all-AMP tactical and other non-tactical SLG work | When clear differences in importance exists between more than two groupings of SLG workloads |
| To benefit from sibling sharing across all SLG workloads as a group | When clear differences in importance exists between two groupings of SLG workloads | When there is a desire to inhibit sibling sharing by segregating each SLG workload on its own tier |
| For more predictable resource allocations for all SLG workloads | If some fluctuation in node-level allocations is acceptable for Tier 2 workloads | Greater inconsistency in node-level allocations for lower SLG Tier workloads is acceptable |

With multiple SLG Tiers defined, query consistency will be greater in the higher tiers, as each succeeding tier is at risk from the varying demands from the tiers that are above.

Some special considerations for the SLG Tier include the following:

If the workloads at the Timeshare level cannot use the resources that flow to the level, those unused resources will be made available to the lowest SLG Tier first. Unused resources flow from the bottom of the hierarchy upwards. If a lower SLG Tier cannot use this backflow, it will be made available to the next lowest SLG Tier level.

Figure 16:
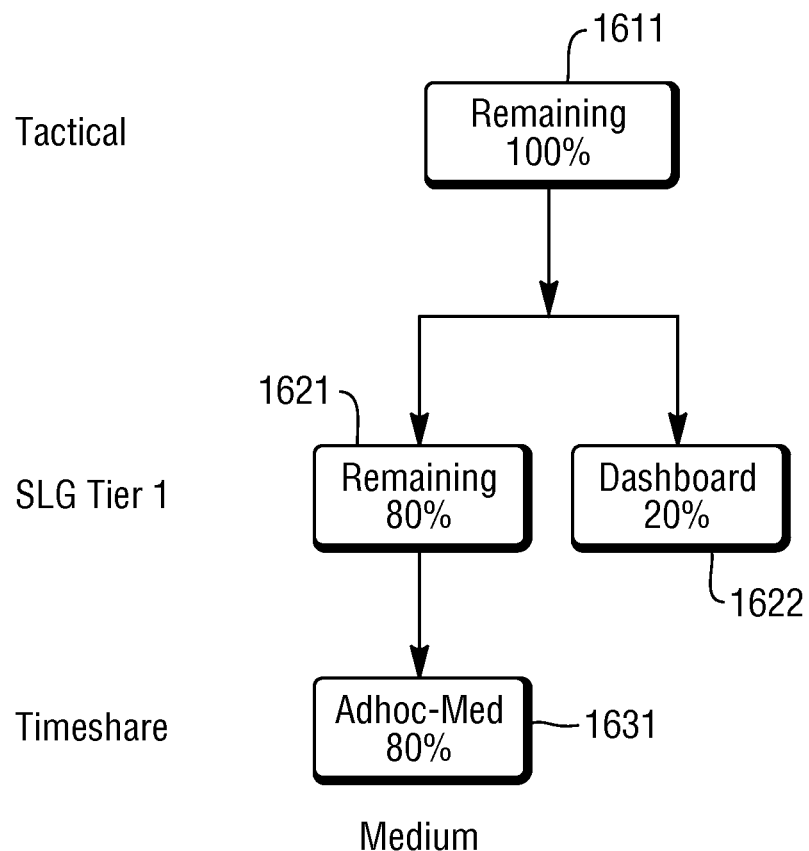
FIG. 16 provides an example wherein a task introduced into a lower tier within a task group hierarchy may complete in less the time than required to complete if it were introduced into a higher tier.

Depending on the allocation that a workload in an SLG Tier has been given, it is possible for the same canary query to run faster in a Timeshare workload than in an SLG Tier workload, even though the SLG Tier workload is higher in the structure than the Timeshare workload. This is illustrated in FIG. 16, wherein a query introduced into Adhoc-Med workload 1631, may complete in one forth the time required to complete if it were introduced into Dashboard workload 1622 on SLG Tier1. In this example, workload 1631 on the Timeshare level receives four times the allocation, 80% via Remaining workload 1621, than workload 1622 on the higher SLG Tier 1.

One approach to eliminate the likelihood of better performance at the Timeshare level is to increase the SLG Tier workload allocations so that less resources flow into the Timeshare level. Another approach is to push the majority of the work running on the platform, particularly resource-intensive work, into the Timeshare access levels. With higher concurrency in the Timeshare level, any given Timeshare query will be given fewer resources. With less work and lower concurrency in the SLG Tiers, better performance can be expected for individual requests that execute there.

Figure 17:
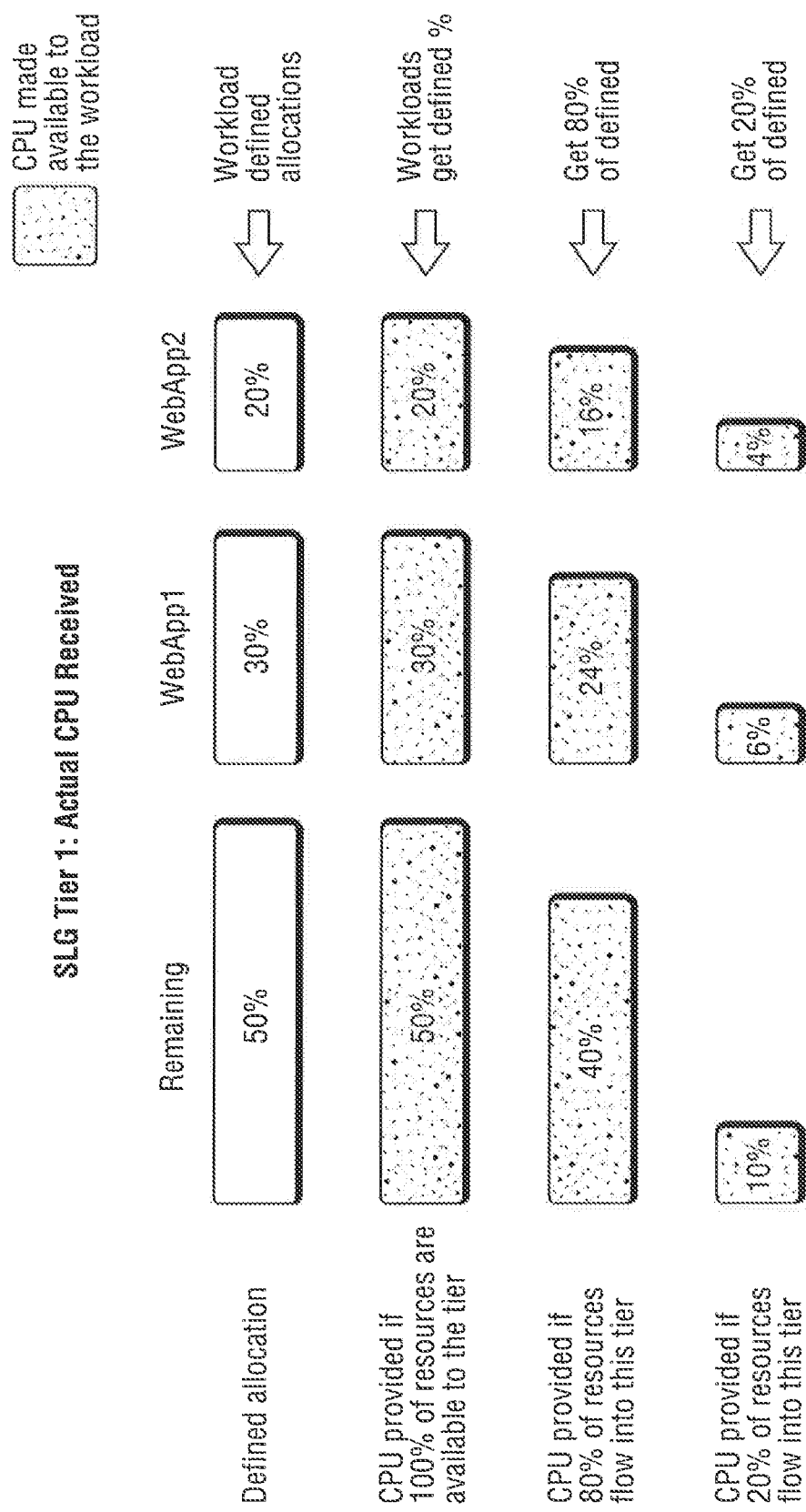
FIG. 17 provides an illustration of the impact resources available to a tier level have upon task group allocations.

Resource availability for SLG Tier workloads is always dependent on two factors: 1) the allocation assigned to the workload, and 2) the resources that flow into the tier. If tactical workloads consume more than a few percentage points, this can have a big impact on the predictability of how much resource SLG workloads will receive. FIG. 17 provides an illustration of what can happen with increasing levels of usage in Tactical.

It is expected that the majority of the resources will be consumed by workloads running in the Timeshare tier. The Timeshare tier is intended for workloads whose response time is less critical to the business and that do not have a service level expectation, and for background work, sandbox applications, and other generally lower priority work. Resources not able to be used by the Tactical Tier or the SLG Tiers, or resources that remain unused due to the presence of the Remaining workloads in above tiers, flow down to the Timeshare Tier workloads. This can be a considerable amount of resource, or it can be a slight amount.

The Timeshare Tier workload management includes four access levels, representing four different priorities: Top, High, Medium, and Low. The administrator must associate a workload to one of those four access levels when a workload is assigned to the Timeshare Tier. Workloads in the Low access level receive the least amount of resources among the Timeshare workloads, while workloads in the Top access level receive the most.

Each of the four access levels has a different access rate:

Each request in the Top access level receives eight times the resources as a Low request, Each request in the High access level receives four times the resource as a Low request, Each request in the Medium access level receives twice the resource as a Low request, and Each Low request gets a minimum base share, based on what is available from the tier above.

The actual resource distribution will depend on which access levels are supporting work at any point in time. However, at each access level, the concurrency of active requests will not reduce the priority differentiation between the levels.

For example, a query running in Top and a query running in Low will always receive resources in an 8-to-1 ratio whether they are running alone or concurrently with 10 other queries within their access level.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for scheduling the execution of a plurality of database tasks within a database system, the method comprising the steps of:
    grouping said database tasks into a plurality of task groups having different priorities to database system resources;
    arranging said task groups into a hierarchy, said hierarchy comprising multiple tiers including a top level tier, a bottom level tier and at least one intermediate level tier between said top level tier and said bottom level tier, said tiers reflecting the priority of said task groups to said database system resources;
    allocating a portion of said database system resources to said task groups within said top level tier, and providing a remaining portion of said database system resources not assigned to said task groups within said top level to the tier immediately below said top level tier;
    for each intermediate level tier: receiving the remaining portion of database system resources not assigned to the task groups in the tier immediately above; assigning a portion of said database system resources received from the tier immediately above to said task groups within said each immediate level tier, and providing a remaining portion of said database system resources not assigned to said task groups within said each immediate tier to the tier immediately below said each immediate level tier;
    for said bottom tier, receiving the remaining portion of database system resources not assigned to the task groups in the tier immediately above; and assigning said database system resources received from the tier immediately above to said task groups within said bottom level tier; and
    executing said database tasks in accordance with said database resource task group allocations.

2. The computer-implemented method for scheduling the execution of a plurality of database tasks within a database system in accordance with claim 1, wherein said database resources include computer processors, computer memory, computer storage devices, and input/output resources.

3. The computer-implemented method for scheduling the execution of a plurality of database tasks within a database system in accordance with claim 1, wherein said task groups comprise database tasks which contribute to a common database request.

4. The computer-implemented method for scheduling the execution of a plurality of database tasks within a database system in accordance with claim 1, wherein:
    task groups including database tasks comprising short requests that have to finish as quickly as possible are placed in said top level tier;
    task groups including database tasks associated with a service level goal are placed in said intermediate level tiers; and
    task groups including database tasks whose response time is less critical to the business and are not associated with a service level goal are placed in said bottom level tier.

5. The computer-implemented method for scheduling the execution of a plurality of database tasks within a database system in accordance with claim 1, further comprising the step of:
    determining a global allocation for each task group, said global allocation being the product of the portion of said database resources allocated to said each task group and the remaining portions of database system resources provided by each tier above said each task group.

6. A database system, running on a computer, the database system comprising:
    at least one computer processor having access to at least one data storage device containing a database; and
    a process executed by said at least one computer processor to schedule the execution of a plurality of database tasks within said database system, said process to:
    group said database tasks into a plurality of task groups having different priorities to database system resources;
    arrange said task groups into a hierarchy, said hierarchy comprising multiple tiers including a top level tier, a bottom level tier and at least one intermediate level tier between said top level tier and said bottom level tier, said tiers reflecting the priority of said task groups to said database system resources;
    allocate a portion of said database system resources to said task groups within said top level tier, and provide a remaining portion of said database system resources not assigned to said task groups within said top level to the tier immediately below said top level tier;
    for each intermediate level tier: receive the remaining portion of database system resources not assigned to the task groups in the tier immediately above; assign a portion of said database system resources received from the tier immediately above to said task groups within said each immediate level tier, and provide a remaining portion of said database system resources not assigned to said task groups within said each immediate tier to the tier immediately below said each immediate level tier;
    for said bottom tier, receive the remaining portion of database system resources not assigned to the task groups in the tier immediately above; and assign said database system resources received from the tier immediately above to said task groups within said bottom level tier; and
    execute said database tasks in accordance with said database resource task group allocations.

7. The database system in accordance with claim 5, wherein said database resources include said at lease one computer processor, computer memory, said at least one computer storage device, and input/output resources.

8. The database system in accordance with claim 5, wherein said task groups comprise database tasks which contribute to a common database request.

9. The database system in accordance with claim 5, wherein:
    task groups including database tasks comprising short requests that have to finish as quickly as possible are placed in said top level tier;
    task groups including database tasks associated with a service level goal are placed in said intermediate level tiers; and
    task groups including database tasks whose response time is less critical to the business and are not associated with a service level goal are placed in said bottom level tier.

10. The database system in accordance with claim 5, wherein said process determines a global allocation for each task group, said global allocation being the product of the portion of said database resources allocated to said each task group and the remaining portions of database system resources provided by each tier above said each task group.

11. A non-transitory computer-readable medium having a computer program for scheduling the execution of a plurality of database tasks within a database system, the computer program including executable instructions that cause a computer to:
   group said database tasks into a plurality of task groups having different priorities to database system resources;
   arrange said task groups into a hierarchy, said hierarchy comprising multiple tiers including a top level tier, a bottom level tier and at least one intermediate level tier between said top level tier and said bottom level tier, said tiers reflecting the priority of said task groups to said database system resources;
   allocate a portion of said database system resources to said task groups within said top level tier, and provide a remaining portion of said database system resources not assigned to said task groups within said top level to the tier immediately below said top level tier;
   for each intermediate level tier: receive the remaining portion of database system resources not assigned to the task groups in the tier immediately above; assign a portion of said database system resources received from the tier immediately above to said task groups within said each immediate level tier, and provide a remaining portion of said database system resources not assigned to said task groups within said each immediate tier to the tier immediately below said each immediate level tier;
   for said bottom tier, receive the remaining portion of database system resources not assigned to the task groups in the tier immediately above; and assign said database system resources received from the tier immediately above to said task groups within said bottom level tier; and
   execute said database tasks in accordance with said database resource task group allocations.

12. The non-transitory computer-readable medium having a computer program for scheduling the execution of a plurality of database tasks within a database system in accordance with claim 11, wherein said database resources include said at least one computer processor, computer memory, said at least one computer storage device, and input/output resources.

13. The non-transitory computer-readable medium having a computer program for scheduling the execution of a plurality of database tasks within a database system in accordance with claim 11, wherein said task groups comprise database tasks which contribute to a common database request.

14. The non-transitory computer-readable medium having a computer program for scheduling the execution of a plurality of database tasks within a database system in accordance with claim 11, wherein:
   task groups including database tasks comprising short requests that have to finish as quickly as possible are placed in said top level tier;
   task groups including database tasks associated with a service level goal are placed in said intermediate level tiers; and
   task groups including database tasks whose response time is less critical to the business and are not associated with a service level goal are placed in said bottom level tier.

15. The non-transitory computer-readable medium having a computer program for scheduling the execution of a plurality of database tasks within a database system in accordance with claim 11, wherein said process determines a global allocation for each task group, said global allocation being the product of the portion of said database resources allocated to said each task group and the remaining portions of database system resources provided by each tier above said each task group.

* * * * *